United States Patent
Nilsson et al.

(10) Patent No.: US 7,283,791 B2
(45) Date of Patent: Oct. 16, 2007

(54) METHOD AND APPARATUS FOR POWER CONTROL IN A MOBILE RADIO SYSTEM

(75) Inventors: Johan Nilsson, Höllviken (SE); Bo Bernhardsson, Lund (SE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 58 days.

(21) Appl. No.: 10/528,736

(22) PCT Filed: Sep. 3, 2003

(86) PCT No.: PCT/EP03/09781

§ 371 (c)(1),
(2), (4) Date: Sep. 19, 2005

(87) PCT Pub. No.: WO2004/028030

PCT Pub. Date: Apr. 1, 2004

(65) Prior Publication Data

US 2006/0099913 A1   May 11, 2006

Related U.S. Application Data

(60) Provisional application No. 60/414,082, filed on Sep. 26, 2002.

(30) Foreign Application Priority Data

Sep. 23, 2002   (EP) .................................. 02256578

(51) Int. Cl.
*H04B 1/00* (2006.01)
(52) U.S. Cl. ....................... 455/69; 455/68; 455/522
(58) Field of Classification Search ............... 455/69, 455/522, 68, 452, 450
See application file for complete search history.

(56) References Cited

U.S. PATENT DOCUMENTS 5,991,284 A   11/1999   Willenegger et al.

(Continued)

FOREIGN PATENT DOCUMENTS

EP   0987833   3/2000

(Continued)

OTHER PUBLICATIONS

Harri Holma, et al.; "WCDMA for UMTS Radio Access for Third Generation Mobile Communications"; John Wiley & Sons, Ltd., 2000.

*Primary Examiner*—Sanh D. Phu
(74) *Attorney, Agent, or Firm*—Michael Cameron

(57) ABSTRACT

A telecommunications system for improving quality of service (QoS) to users via the implementation of an extended outer loop power control algorithm. A radio resource manager (RRM) operates to determine the number of channels allotted to users within a network at a certain time. The RRM implements the extended outer loop power control algorithm for each allotted channel, thus determining SIR reference values for each allotted channel the RRM ensures that the SIR reference value for any channel does not fall bellow a predetermined minimum value. The SIR reference value to be used for all channels in use is determined as the highest of all the calculated SIR reference values. The extended outer loop power control algorithm can be implemented at a mobile station level, base station level or radio network controller level.

20 Claims, 4 Drawing Sheets

U.S. PATENT DOCUMENTS

| | | | |
|---|---|---|---|
| 6,173,162 B1 * | 1/2001 | Dahlman et al. | 455/69 |
| 6,285,887 B1 * | 9/2001 | Mimura | 455/522 |
| 6,622,024 B2 * | 9/2003 | Koo et al. | 455/522 |
| 6,873,856 B2 * | 3/2005 | Voyer | 455/522 |

FOREIGN PATENT DOCUMENTS

EP  1215833  6/2002

* cited by examiner

METHOD AND APPARATUS FOR POWER CONTROL IN A MOBILE RADIO SYSTEM

This patent application claims the benefit of priority from U.S. Provisional Patent Application Ser. No. 60/414,082 filed on Sep. 26, 2002. This application incorporates by reference the entire disclosure of U.S. Provisional Patent Application Serial No. 60/414,082.

TECHNICAL FIELD OF THE INVENTION

The present invention relates to power control in Radio Resource Management, and in particular to a system with multiple transport channels.

DESCRIPTION OF RELATED ART

In modern telecommunications networks, the utilisation of air interface resources and the maintenance of Quality of Service (QoS) is determined by Radio Resource Management (RRM). RRM is responsible for the following functions; handover, power control, admission control, load control and packet scheduling. Each of these functions is implemented by a relevant RRM algorithm.

Third generation telecommunications networks need to support high quality services and to multiplex several services on one connection. In particular, power control plays an important role in the provision of the required QoS, by keeping the interference levels in the air interface at a minimum. The power control algorithm may be implemented at User Equipment (UE) level, Base Station (BS) level or Radio Network Controller (RNC) level. These three network elements are illustrated in FIG. 1, wherein the BS 10 includes a transceiver 12 and a processor 14, which processor 14 has a fixed connection to the RNC 16. The MS 18 is not generally of a fixed location.

Aspects of power control which are specific to third generation systems (such as Wideband Code Division Multiple Access, WCDMA) and are not present in second generation systems (such as Global System for Mobile Communications, GSM) include fast power control and outer loop power control. Fast power control in WCDMA has a frequency of approximately 1.5 kHz and is supported in both uplink and downlink. The outer loop power control algorithm estimates the received signal quality in order to adjust the Signal to Interference Ratio (SIR) reference for the fast power control so that the required QoS is maintained. Signal quality can be affected by changes in the MS speed or the multipath propagation environment. Outer loop power control in WCDMA has a frequency of approximately 10-100 Hz, and is needed in both uplink and downlink because there is fast power control in both uplink and downlink.

FIG. 2 is a flow chart outlining a general outer loop power control algorithm. An initial assessment 20 is made as to whether the quality of signal received on the uplink is better than the required quality of signal. Where this is the case, the SIR reference for fast power control is decreased 22 to avoid wasted network capacity. In contrast, where the quality of signal is less than the required quality, the SIR reference is increased 24 so that the required QoS is maintained.

QoS is a direct function of errors arising from the received signals, which errors arise from inaccurate SIR estimation, signalling errors and delays in the power control loop. In order to assess the quality of signal received on the uplink, several known methods can be employed. For example, the quality assessment can be based on an estimated physical channel Bit Error Rate (BER), received SIR or a Cyclic Redundancy Check (CRC).

The CRC assessment is generally utilised for network services where errors are allowed to occur fairly frequently, at least once every few seconds. This can be in non-real-time packet data service where the block error rate (BLER) can be up to 10-20% before retransmissions, and the speech service where typically BLER=1% provides the required quality.

One possible outer loop power control algorithm is given by the so-called proportional-integral (PI) algorithm. This can be characterised as follows:

$$SIR_r(k) = kp*e(k) + ki*I(k)$$

where k denotes block number, $SIR_r(k)$ denotes the SIR reference for block k, kp and ki are parameters which control algorithm convergence speed and stability, e(k) is a variable which indicates the difference between required QoS and actual QoS, and I(k) is a parameter which sets a steady state value for the SIR reference, where $I(k+1) = I(k) + e(k)$. For example one could use;

$$e(k) = -BLER_r \text{ if CRC ok,}$$

$$e(k) = 1 - BLER_r \text{ if CRC not ok}$$

where $BLER_r$ refers to the BLER reference. It is also possible to filter e(k) to get a smoother behaviour. Examples of values of the constants kp and ki are kp=0.3 and ki=0.8. A special case is given by the parameter choice:

$$kp = 0$$

$$ki = SIR_{inc}/(1 - BLER_r)$$

which gives the so-called jump algorithm disclosed in "WCDMA for UMTS" edited by Holma and Toskala, Wiley & Sons Ltd, 2000, pages 187-203. This jump algorithm is based on the result of a CRC assessment of the data and can be characterised as follows:

$$SIR_r(k+1) := \begin{cases} SIR_r(k) + SIR_{inc} & \text{if CRC not OK,} \\ SIR_r(k) - \dfrac{BLER_r}{1 - BLER_r} SIR_{inc} & \text{if CRC OK.} \end{cases}$$

where $SIR_{inc}$ refers to an incremental increase in the SIR reference for the channel under consideration. $SIR_{inc}$ is typically 0.3 dB to 1.0 dB.

Both the PI algorithm and the jump algorithm calculate an updated SIR reference value based on the value of the previous SIR reference value. Where the received signal quality is better than the required signal quality, then the updated SIR reference value will be an incremental decrease. Where the received signal quality is worse than the required signal quality, then the updated SIR reference value will be an incremental increase.

In order to make efficient use of network capacity, the outer loop power control should keep the SIR reference as low as possible at all times. Although, an SIR reference value that is too low will lead to decreased QoS. The data traffic situation can vary over time and so a flexible and reliable system is required to ensure that users experience an acceptable QoS.

This known power control function does not enable a suitable SIR reference to be determined where multiple transport channels are used. When multiple transport channels are multiplexed on a physical channel a common SIR reference must be found which gives sufficiently good performance for all transport channels. The necessary SIR level is a complicated function of coding scheme, channel quality, equipment velocity and other parameters and can not be calculated easily. The number of possible combinations of transport channels is also very large which makes utilisation of a look-up table unfeasible.

SUMMARY

The present invention seeks to provide a power control function in RRM in which the required QoS is maintained for multiple transport channels and problems in known systems associated with data traffic changes are alleviated.

According to a first aspect of the present invention, there is provided a method of power control in a mobile telecommunications network, the method comprising the steps of calculating a signal strength reference value for each of a plurality of channels in use based on a previously calculated value for that channel, maintaining the calculated signal strength reference value for a channel at or above a predetermined minimum signal strength reference value, and determining a signal strength reference value to be used for all of said plurality of channels in use, as the highest of all of the calculated signal strength reference values.

According to a second aspect of the present invention, there is provided a mobile station in a telecommunications network, wherein the mobile station comprises means for performing power control by the method specified in the first aspect of the present invention.

According to a third aspect of the present invention, there is provided a base station in a telecommunications network, wherein the base station comprises means for performing power control by the method specified in the first aspect of the present invention.

According to a fourth aspect of the present invention, there is provided a telecommunications network comprising means for performing power control by the method specified in the first aspect of the present invention.

It should be emphasised that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

For a better understanding of the present invention, and to show how it may be put into effect, reference will now be made, by way of example, to the accompanying drawings in which.

DETAILED DESCRIPTION OF EMBODIMENTS

Figure 1:
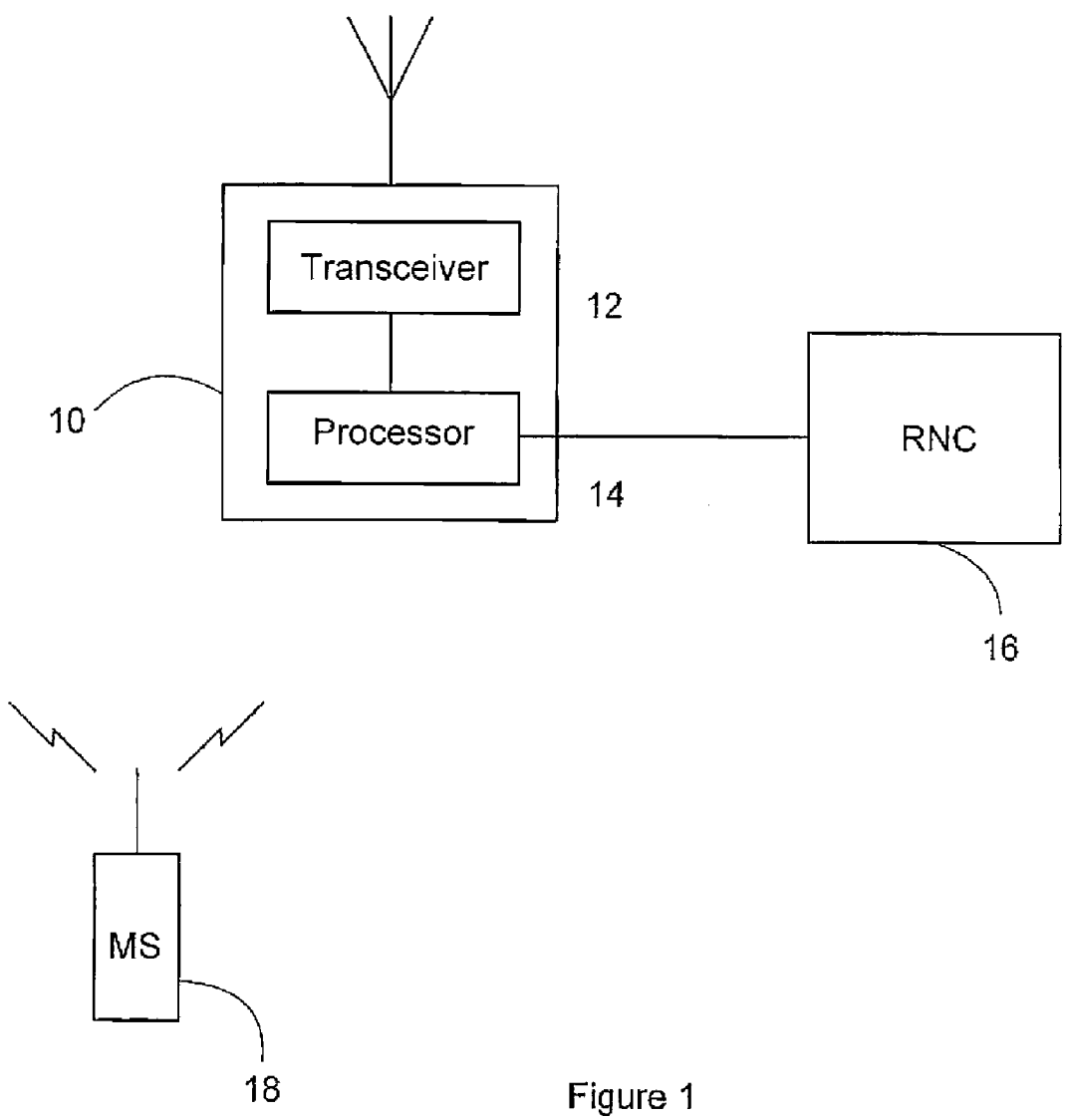
FIG. 1 is a schematic diagram of the basic features in a radio telecommunications network.
Figure 2:
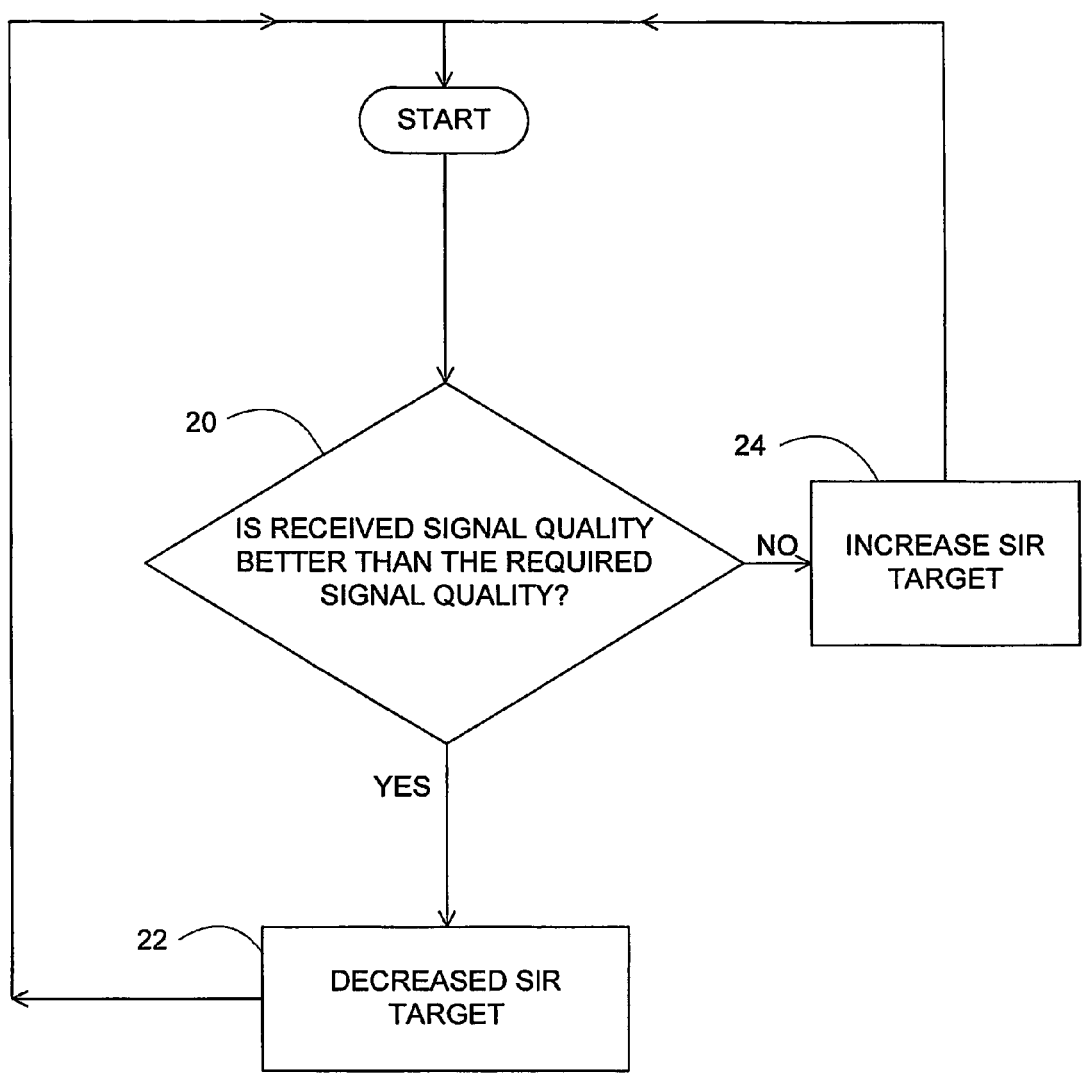
FIG. 2 shows a flow chart outlining a general outer loop power control algorithm.

Where a telecommunications network has several channels in use, Radio Resources Management (RRM) implements an extended outer loop power control algorithm. This algorithm functions to determine a single SIR reference value suitable for all of the channels in use at one time. This is achieved by determining a separate used SIR reference value for each channel l, where l={1, . . . , number of channels in use}. The initial step may be characterised as follows:

$$SIR_r(l, 0) = \frac{1}{b_2}(\log_{10}(BLER_r(l)) - a_2)$$

In practice, $a_2$ could be 0.6 and $b_2$ could be −1.5. Clearly, this SIR reference is dependent upon the channel user's QoS requirements.

In order to update the SIR reference for each allotted channel at the following block, k=1, a quality assessment is performed on that channel (shown below using a CRC). The updating step may be characterised as follows:

$$SIR_r(l, k+1) := \begin{cases} SIR_r(l, k) + SIR_{inc} & \text{if } CRC \ (l) \text{not OK}, \\ SIR_r(l, k) - \frac{BLER_r(l)}{1 - BLER_r(l)} SIR_{inc} & \text{if } CRC \ (l) \text{OK}. \end{cases}$$

where $SIR_{inc}$ refers to an incremental increase in the SIR reference for channel 1. $SIR_{inc}$ is typically 0.3 dB to 1.0 dB, and may be the same for all channels. In other words, where the received signal quality is better than the required signal quality, then the updated SIR reference value will be an incremental decrease. Where the received signal quality is worse than the required signal quality, then the updated SIR reference value will be an incremental increase.

The updated SIR reference value is compared with a predetermined minimum SIR reference value. Where the former is greater than the latter, then the updated SIR reference value is used. If the updated SIR reference value calculated is below the predetermined minimum SIR reference value, the predetermined minimum SIR reference value is substituted for the updated SIR reference value.

This comparison may be characterised as follows:

$$SIR_r(l, k+1) := \max(SIR_r(l,k+1), SIR_{min})$$

In order for the network to set an overall updated SIR reference value for all allotted channels the following equation applies:

$$SIR_r(k) = \max_l SIR_r(l, k)$$

All channels multiplexed on a common physical channel must use a common SIR reference value. Thus, the highest updated SIR reference value for all allotted channels for a particular block k, is used as the overall SIR reference value for the group of channels for that block.

The reason for setting a predetermined minimum SIR reference value for each channel is that, if this were not done, the calculated SIR reference value for a channel could reach very low values. This is the case if the channel achieves better QoS than requested for a long period of time. If the channel multiplexing situation changes, for instance when a new channel is dropped or added, or when the QoS parameters for a channel changes, the used SIR reference value may become insufficient to achieve accurate QoS for this channel. Without the predetermined minimum SIR reference value, it could take excessive time for the calculated updated SIR reference value to reach an acceptable level again.

Typically, setting $SIR_{min}$ to −10 dB will enable all allotted channels to regain control of the SIR reference within a reasonable time (generally less than 1 second) if the traffic situation changes.

Figure 3:
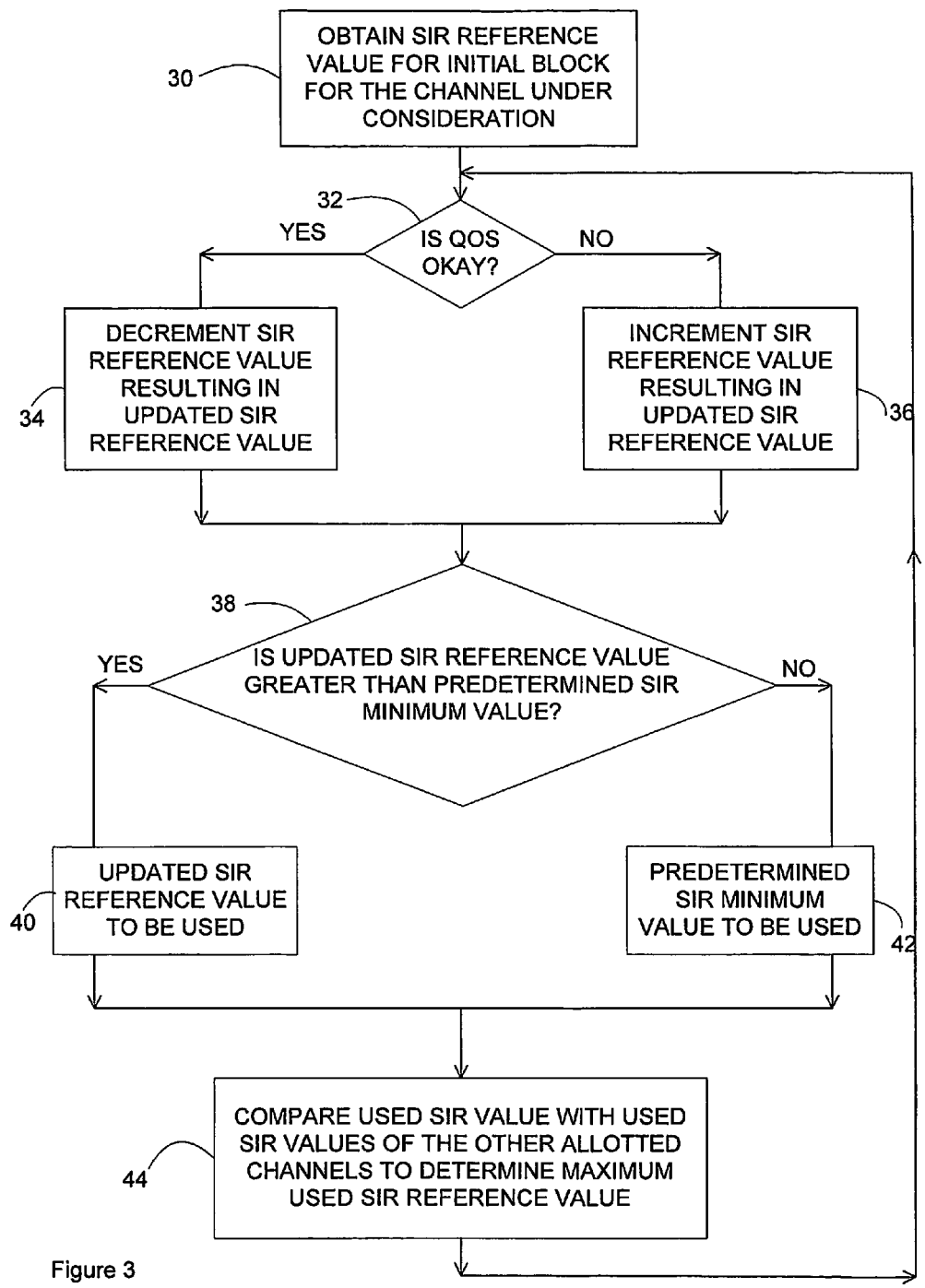
FIG. 3 shows a flow chart outlining use of an extended outer loop power control algorithm in accordance with the present invention.

In FIG. 3, a RRM operates in step 30 to obtain an SIR reference value for the initial block for the allotted channel under consideration. A QoS assessment is performed in step 32 by means of, for example, a CRC. Where it is determined that the current quality is acceptable, the SIR reference value is decremented in step 34 resulting in an updated SIR reference value. However, where the QoS is inadequate for user requirements the SIR reference value is incremented in step 36 in order to achieve the updated SIR reference value. A comparison is performed in step 38 to determine whether the updated SIR reference value is greater than a predetermined SIR minimum value. Thus, where the updated SIR reference value is greater than the predetermined SIR minimum value then the updated SIR reference value is utilised in step 40 for the block and channel under consideration. However, where the updated SIR reference value is less than the predetermined SIR minimum value, the predetermined SIR minimum value is utilised in step 42 instead of the updated SIR reference value.

It will be apparent to the skilled person that the outer loop power control algorithm implemented on the channel under consideration in FIG. 3 can be implemented for each of several further allotted channels within the telecommunications network under the control of the RRM. The SIR reference value to be used for each channel in respect of the same block is compared in step 44 to determine a maximum used SIR reference value, which value is said to control the SIR reference value for the telecommunications network. Thus, by use of the used SIR reference values of the allotted channels the RRM is implementing an extended outer loop power control algorithm in accordance with the present invention.

It is necessary for this process to be repeated for each of blocks k=0, 1, 2, 3, . . . , n, to ensure an acceptable QoS is provided even when the variables involved (such as number of allotted channels, maximum SIR reference value required, etc.) change.

Thus, the SIR reference value is set for multiple transport channels and advantageously the complexity of the extended outer loop power control algorithm is very low.

Figure 4:
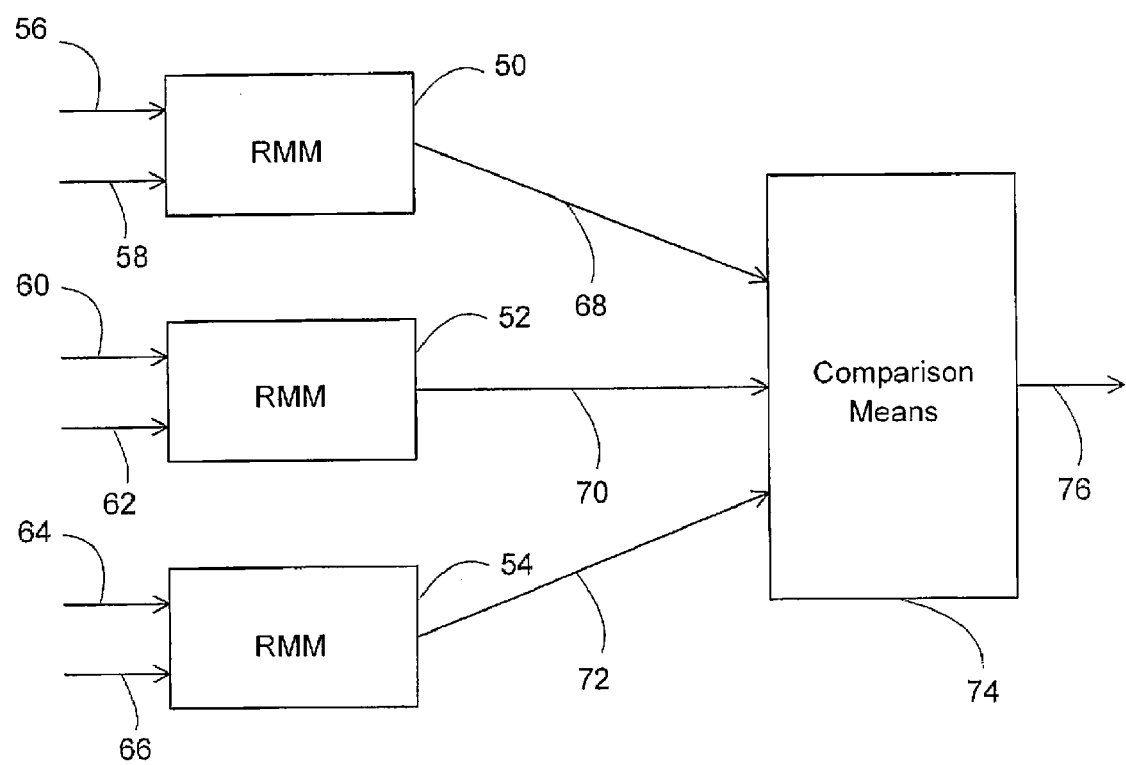
FIG. 4 is a schematic diagram of the network structure in accordance with the present invention.

FIG. 4 further illustrates the flow chart of FIG. 3, showing the use of a common maximum used SIR reference value for multiple channels within a network. A first RMM 50, a second RMM 52 and a third RMM 54 each have two inputs. The single output 68 70 72 from the first, second and third controllers 50 52 54 are multiplexed onto a single physical channel 76 via a single comparison means 74.

In operation, the first RMM 50 has two input signals, namely a first SIR reference value 56 and a first predetermined SIR minimum value 58. The second RMM 52 has two input signals, a second SIR reference value 60 and a second predetermined SIR minimum value 62. Similarly, the third RMM 54 has two input signals, a third SIR reference value 64 and a third predetermined SIR minimum value 66. Each RMM performs a QoS assessment and, dependent upon the result, increments or decrements the SIR reference value. Each RMM has a single output 68 70 72 comprising a used SIR value specific to that channel. The comparison means 74 functions to determine the maximum used SIR reference value from the first, second and third used SIR values 68 70 72 input to the comparison means 74. This value is said to control the SIR reference value for the telecommunications network. The QoS assessment performed by each RRM implements an extended outer loop power control algorithm in accordance with the present invention.

It will be apparent to the skilled person that the above specified algorithm is not exhaustive and variations may be employed to achieve a similar result whilst employing the same inventive concept. For example, the extended outer loop power control algorithm can be implemented at a mobile station level, base station level or radio network controller level.

Furthermore, the skilled person will be aware that the present invention may be implemented in respect of any outer loop power control algorithm, such as the PI algorithm or the jump algorithm.

It can therefore be seen that the present invention provides power control in RRM which has significant advantages over the conventional systems.

The invention claimed is:

1. A method of power control in a mobile telecommunications network, the method comprising the steps of:
    calculating a signal strength reference value for each of a plurality of channels in use based on a previously calculated value for that channel;
    maintaining the calculated signal strength reference value for a channel at or above a predetermined minimum signal strength reference value; and
    determining a signal strength reference value to be used for all of said plurality of channels in use, as the highest of all of the calculated signal strength reference values.

2. The method as claimed in claim 1, wherein the signal strength reference value for a channel is a Signal-to-Interference Ratio (SIR) reference value.

3. The method as claimed in claim 1, further comprising incrementally increasing or decreasing the signal strength reference value dependent upon a quality criteria check.

4. The method as claimed in claim 2, wherein the step of calculating a SIR reference value for each of the plurality of channels in use is performed by applying the algorithm:

$$SIR_r(k) = kp * e(k) + ki * I(k)$$

where k denotes block number, $SIR_r(k)$ denotes the SIR reference for block k, kp and ki are parameters which control algorithm convergence speed and stability and $I(k1) = I(k) + e(k)$.

5. The method as claimed in claim 4, wherein e(k) takes different values dependent upon whether a predetermined quality criterion is met, such that:

$e(k) = BLER_r$ if quality criterion met, $e(k) = 1 - BLER_r$ if quality criterion not met where $BLER_r$ refers to the BLER reference.

6. The method as claimed in claim 4, wherein the parameters:

$kp = 0$ $ki = SIR_{inc}/(1 - BLE_r)$ are used, where $SIR_{inc}$ refers to an incremental increase in the SIR reference.

7. The method as claimed in claims 2, 4, 5 or 6, wherein the step of maintaining the calculated signal strength reference value for a channel is determined via a Proportional Integral (PI) algorithm and characterised by:

$$SIR_r(l, k+1) := \begin{cases} SIR_r(l, k) + SIR_{inc} & \text{if quality criterion not met,} \\ SIR_r(l, k) - \dfrac{BLER_r(l)}{1 - BLER_r(l)} SIR_{inc} & \text{if quality criterion met.} \end{cases}$$

where $SIR_r(l,k)$ denotes the SIR reference for channel $l=1, \ldots, N$ at block k. $BLER_r(l)$ refers to the BLER reference for channel l.

8. The method as claimed in claim 7, wherein the quality criterion check is based on a Bit Error Rate (BER) reference value.

9. The method as claimed in claim 7, wherein the quality criterion check is based on a Cyclic Redundancy Check (CRC) reference value.

10. The method as claimed in claim 7, comprising calculating an initial SIR reference value $SIR_r(l, 0)$ for each of the plurality of channels in use for an initial block k=0 as:

$$SIR_r(l, 0) = \frac{1}{b_2}(\log_{10}(BLER_r(l)) - a_2)$$

where $a_2$ and $b_2$ are channel model parameters.

11. The method as claimed in claim 1, wherein the mobile telecommunications network uses WCDMA.

12. A mobile station for use in a telecommunications network, wherein the mobile station comprises means for performing power control by a method comprising:
calculating a signal strength reference value for each of a plurality of channels in use based on a previously calculated value for that channel;
maintaining the calculated signal strength reference value for a channel at or above a predetermined minimum signal strength reference value; and
determining a signal strength reference value to be used for all of said plurality of channels in use, as the highest of all of the calculated signal strength reference values.

13. The mobile station as claimed in claim 12, wherein the step of maintaining the calculated signal strength reference value for a channel is determined via a Proportional Integral (PI) algorithm and characterised by:

$$SIR_r(l, k+1) := \begin{cases} SIR_r(l, k) + SIR_{inc} & \text{if quality criterion not met,} \\ SIR_r(l, k) - \frac{BLER_r(l)}{1 - BLER_r(l)} SIR_{inc} & \text{if quality criterion met.} \end{cases}$$

where $SIR_r(l, k)$ denotes the SIR reference for channel $l=1, \ldots, N$ at block k. $BLER_r(l)$ refers to the BLER reference for channel l.

14. The mobile station as claimed in claims 12 or 13, wherein the mobile telecommunications network uses WCDMA.

15. A base station for use in a telecommunications network, wherein the base station comprises means for performing power control by a method comprising:
calculating a signal strength reference value for each of a plurality of channels in use based on a previously calculated value for that channel;
maintaining the calculated signal strength reference value for a channel at or above a predetermined minimum signal strength reference value; and
determining a signal strength reference value to be used for all of said plurality of channels in use, as the highest of all of the calculated signal strength reference values.

16. The base station as claimed in claim 15, wherein the step of maintaining the calculated signal strength reference value for a channel is determined via a Proportional Integral (PI) algorithm and characterised by:

$$SIR_r(l, k+1) := \begin{cases} SIR_r(l, k) + SIR_{inc} & \text{if quality criterion not met,} \\ SIR_r(l, k) - \frac{BLER_r(l)}{1 - BLER_r(l)} SIR_{inc} & \text{if quality criterion met.} \end{cases}$$

where $SIR_r(l, k)$ denotes the SIR reference for channel $l=1, \ldots, N$ at block k $BLER_r(l)$ refers to the BLER reference for channel l.

17. The base station as claimed in claims 15 or 16, wherein the mobile telecommunications network uses WCDMA.

18. A telecommunications network, comprising means for performing power control by a method comprising:
calculating a signal strength reference value for each of a plurality of channels in use based on a previously calculated value for that channel;
maintaining the calculated signal strength reference value for a channel at or above a predetermined minimum signal strength reference value; and
determining a signal strength reference value to be used for all of said plurality of channels in use, as the highest of all of the calculated signal strength reference values.

19. The telecommunications network as claimed in claim 18, wherein the step of maintaining the calculated signal strength reference value for a channel is determined via a Proportional Integral (PI) algorithm and characterised by:

$$SIR_r(l, k+1) := \begin{cases} SIR_r(l, k) + SIR_{inc} & \text{if quality criterion not met,} \\ SIR_r(l, k) - \frac{BLER_r(l)}{1 - BLER_r(l)} SIR_{inc} & \text{if quality criterion met.} \end{cases}$$

where $SIR_r(l, k)$ denotes the SIR reference for channel $l=1, \ldots, N$ at block k. $BLER_r(l)$ refers to the BLER reference for channel l.

20. The telecommunications network as claimed in claims 18 or 19, wherein the mobile telecommunications network uses WCDMA.

* * * * *

UNITED STATES PATENT AND TRADEMARK OFFICE
CERTIFICATE OF CORRECTION

PATENT NO. : 7,283,791 B2  
APPLICATION NO. : 10/528736  
DATED : October 16, 2007  
INVENTOR(S) : Nilsson et al.

Page 1 of 1

It is certified that error appears in the above-identified patent and that said Letters Patent is hereby corrected as shown below:

On the Title Page, item (73), under "Assignee", in Column 1, Line 1, delete "Telefonktiebolaget" and insert -- Telefonaktiebolaget --, therefor.

On the Title Page, item (57), under "ABSTRACT", in Column 2, Line 8, after "channel" insert -- . --.

On the Title Page, item (57), under "ABSTRACT", in Column 2, Line 8, before "RRM" delete "the" and insert -- The --, therefor.

On the Title Page, item (57), under "ABSTRACT", in Column 2, Line 10, delete "bellow" and insert -- below --, therefor.

In Column 6, Line 35, in Claim 4, delete "$SIR,(k)$" and insert -- $SIR_r(k)$ --, therefor.

In Column 6, Line 38, in Claim 4, delete "$I(kl$" and insert -- $I(k+1)$ --, therefor.

In Column 6, Line 44, in Claim 5, delete "$e(k) = BLER_r$" and insert -- $e(k) = - BLER_r$ --, therefor.

In Column 6, Line 53, in Claim 6, delete "$(1-BLE_r)$" and insert -- $(1-BLER_r)$ --, therefor.

Signed and Sealed this

Fifteenth Day of July, 2008

JON W. DUDAS  
*Director of the United States Patent and Trademark Office*

UNITED STATES PATENT AND TRADEMARK OFFICE
CERTIFICATE OF CORRECTION

PATENT NO. : 7,283,791 B2  
APPLICATION NO. : 10/528736  
DATED : October 16, 2007  
INVENTOR(S) : Nilsson et al.

It is certified that error appears in the above-identified patent and that said Letters Patent is hereby corrected as shown below:

On the Face Page, in Field (73), under "Assignee", in Column 1, Line 1, delete "Telefonktiebolaget" and insert -- Telefonaktiebolaget --, therefor.

On the Face Page, in Field (57), under "ABSTRACT", in Column 2, Line 8, after "channel" insert -- . --.

On the Face Page, in Field (57), under "ABSTRACT", in Column 2, Line 8, before "RRM" delete "the" and insert -- The --, therefor.

On the Face Page, in Field (57), under "ABSTRACT", in Column 2, Line 10, delete "bellow" and insert -- below --, therefor.

In Column 6, Line 35, in Claim 4, delete "$SIR,(k)$" and insert -- $SIR_r(k)$ --, therefor.

In Column 6, Line 38, in Claim 4, delete "$I(k1$" and insert -- $I(k+1)$ --, therefor.

In Column 6, Line 44, in Claim 5, delete "$e(k) = BLER_r$" and insert -- $e(k) = -BLER_r$ --, therefor.

In Column 6, Line 53, in Claim 6, delete "$(1- BLE_r)$" and insert -- $(1-BLER_r)$ --, therefor.

Signed and Sealed this

Twenty-second Day of July, 2008

JON W. DUDAS  
*Director of the United States Patent and Trademark Office*